(12) United States Patent
Feng et al.

(10) Patent No.: US 8,553,847 B2
(45) Date of Patent: Oct. 8, 2013

(54) METHOD AND DEVICE FOR DETERMINING, AND METHOD AND SYSTEM FOR CONFIGURING DSL REFERENCE VIRTUAL NOISE

(75) Inventors: Ruzhou Feng, Shenzhen (CN); Jun Zhou, Shenzhen (CN); Jianhua Liu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 488 days.

(21) Appl. No.: 12/562,845

(22) Filed: Sep. 18, 2009

(65) Prior Publication Data

US 2010/0014645 A1   Jan. 21, 2010

Related U.S. Application Data (63) Continuation of application No. PCT/CN2008/070410, filed on Mar. 5, 2008.

(30) Foreign Application Priority Data

Mar. 20, 2007 (CN) .......................... 2007 1 0086910
Aug. 15, 2007 (CN) .......................... 2007 1 0142516

(51) Int. Cl.
H04M 1/24 (2006.01)
H04M 3/08 (2006.01)
H04M 3/22 (2006.01)

(52) U.S. Cl.
USPC .................... 379/22.08; 379/1.03; 379/24

(58) Field of Classification Search
USPC ........ 379/1.03, 1.04, 22.08, 24, 28; 370/241, 370/252; 375/222, 224, 227, 229, 231
See application file for complete search history.

(56) References Cited

U.S. PATENT DOCUMENTS

| 2003/0123560 A1* | 7/2003 | Jacobsen et al. ............. 375/260 |
| 2004/0264559 A1 | 12/2004 | Cendrillon et al. |
| 2006/0095581 A1 | 5/2006 | Ali et al. |
| 2006/0146922 A1 | 7/2006 | Modlin |
| 2008/0031313 A1* | 2/2008 | Oksman ........................ 375/222 |
| 2008/0205609 A1 | 8/2008 | Zhou |
| 2012/0257691 A1 | 10/2012 | Ginis et al. |

FOREIGN PATENT DOCUMENTS

| CN | 1210399 A | 3/1999 |
| CN | 1535513 A | 10/2004 |
| CN | 1578186 A | 2/2005 |
| CN | 1588966 A | 3/2005 |
| CN | 1844940 A | 10/2006 |
| CN | 1866999 A | 11/2006 |

(Continued)

OTHER PUBLICATIONS

European Patent Office, Extended European Search Report in European Patent Application No. 08715146.0 (Apr. 16, 2010).

(Continued)

*Primary Examiner* — Quoc D Tran
(74) *Attorney, Agent, or Firm* — Leydig, Voit & Mayer, Ltd.

(57) ABSTRACT

A method for determining reference virtual noise of Digital Subscriber Line (DSL), includes: obtaining a receiver-end-actual noise of DSL subcarriers; and determining a reference virtual noise according to the obtained receiver-end-actual noise of the DSL subcarriers. Furthermore, the invention also discloses a device for determining a reference virtual noise of DSL, and a method and a system for configuring the reference virtual noise of DSL. The invention can improve the accuracy of the reference virtual noise, thereby making the configuration of the reference virtual noise more accurate.

23 Claims, 4 Drawing Sheets

(56) References Cited

FOREIGN PATENT DOCUMENTS

| CN | 101272160 A | 9/2008 |
|---|---|---|
| CN | 101453242 A | 6/2009 |
| WO | 2006120521 A1 | 11/2006 |
| WO | WO 2006-131793 A2 | 12/2006 |
| WO | WO 2007-118388 A1 | 10/2007 |
| WO | WO 2008-113280 A1 | 9/2008 |

OTHER PUBLICATIONS

State Intellectual Property Office of the People'S Republic of China, English Translation of Written Opinion of the International Searching Authority in International Patent Application No. PCT/CN2008/070410 (Jun. 12, 2008).

International Telecommunications Union (ITU), "Very High Speed Digital Subscriber Line Transceivers 2 (VDSL2)," Series G: Transmission Systems and Media, Digital Systems and Networks, Digital Sections and Digital Line System—Access Networks, G.993.2, XP17404696, pp. 1-250 (Feb. 17, 2006).

P. Verbaeten et al., "Equalization and Echo Cencellation in DMT-Based Systems," Katholieke Universiteit Leuven, pp. 1-309 (Apr. 2004).

$1^{st}$ Office Action in corresponding Chinese Application No. 200710142516.X (Jan. 26, 2011).

* cited by examiner

Fig. 9

METHOD AND DEVICE FOR DETERMINING, AND METHOD AND SYSTEM FOR CONFIGURING DSL REFERENCE VIRTUAL NOISE

CROSS REFERENCE TO RELATED APPLICATIONS

This application is a continuation of International Patent Application No. PCT/CN2008/070410, filed on Mar. 5, 2008, which claims priority to Chinese Patent Application Nos. 200710086910.6, filed on Mar. 20, 2007, and 200710142516.X, filed on Aug. 15, 2007. The entire contents of the above identified applications are incorporated by reference herein in their entireties.

FIELD OF THE INVENTION

The present invention relates to Digital Subscriber Line (DSL) technology, more particularly to a method and device for determining, and a method and system for configuring DSL reference virtual noise.

BACKGROUND OF THE INVENTION

DSL technology is a high speed transmission technology for data transmission via telephone twist pair, namely Unshielded Twist Pair (UTP), including Asymmetrical Digital Subscriber Line (ADSL), Very-high-bit-rate Digital Subscriber Line (VDSL), Digital Subscriber Line based on Integrated Services Digital Network (ISDN) (ISDN Digital Subscriber Line, IDSL), Single-pair High-bit-rate Digital Subscriber Line (SHDSL), Asymmetrical Digital Subscriber Line 2 (ADSL2), Asymmetrical Digital Subscriber Line 2plus (ADSL2plus), and Very-high-bit-rate Digital Subscriber Line 2 (VDSL2), etc.

In various digital subscriber line technologies (xDSL), except for baseband transmission DSL like IDSL and SHDSL, the DSL using pass band transmission allows DSL and Plain Old Telephone Service (POTS) to coexist in the same twist pair, by using frequency division multiplexing technology, with DSL occupying high frequency band and POTS occupying baseband portion below 4 KHz. POTS signal splits or integrates with DSL signal by Splitter/integrator.

For the twist pair used by DSL, the pairs are unshielded from each other. The electromagnetic interference between the pairs may result in the signal of one twist pair impacting that of another, i.e. crosstalk interference. With the development of DSL technology, the rate is becoming higher and higher and the frequency spectrum is becoming wider and wider. In new generation DSL technology VDSL2, a maximum bidirectional line rate reaches 200 Mbps and the frequency spectrum range reaches 40 MHz. Such a wide frequency spectrum range causes VDSL2 quite sensitive to the noise coupled from the crosstalk interference between cables, and Radio Frequency Interference (RFI). Situations like high bit error rate and high dropping rate may occur in practical application.

Virtual Noise scheme is one of the methods to improve the line stability. A transmitter-reference virtual noise (TXREFVN) is pre-configured in DSL transmitter end and is transferred to a receiver end during DSL training. In the training process, the receiver end may obtain an attenuation feature H log (f) of each subcarrier and calculate reference virtual noise at the receiver end. The receiver end selects a maximum value from an receiver-end-actual noise obtained in the training process and the receiver-end-reference virtual noise, and decides an assigned bit and gain on each subcarrier, in order to ensure, that after DSL line is activated, each subcarrier has a relatively high noise margin, and can resist the noise interference that might occur, therefore improving the stability of the line.

However, in the process of implementing the invention, the inventor finds that in the prior art the virtual noise is set manually according to a predicted possible maximum crosstalk situation. The set value may not comply with an actual operational situation and the virtual noise may be too high or too low, with the set value too high resulting in a high cost leading to performance loss, and the set value too low resulting in no protection to lines when the actual noise occurs.

SUMMARY OF THE INVENTION

Various embodiments of the invention provide, in one aspect, a method and device for determining DSL reference virtual noise to improve the accuracy of reference virtual noise, and in another aspect, a method and system for configuring DSL reference virtual noise to improve the DSL line stability by configuring accurate reference virtual noise.

A method for determining DSL reference virtual noise includes: obtaining receiver-end-actual noise of DSL subcarriers; and determining reference virtual noise according to the receiver-end-actual noise of the DSL subcarriers.

A method for configuring DSL reference virtual noise includes: obtaining a receiver-end-actual noise of DSL subcarriers; and determining reference virtual noise according to the obtained receiver-end-actual noise of the DSL subcarriers, and configuring DSL reference virtual noise parameter using the determined reference virtual noise.

A device for determining DSL reference virtual noise includes an actual noise obtaining module and a reference virtual noise determination module: The actual noise obtaining module is configured to obtain a receiver-end-actual noise of DSL subcarriers, and provide a data related to the receiver-end-actual noise of the subcarriers to the reference virtual noise determination module. The reference virtual noise determination module is configured to determine a reference virtual noise according to the data from the actual noise obtaining module.

A system for configuring DSL reference virtual noise includes: a reference virtual noise determination device configured to obtain a receiver-end-actual noise of DSL subcarriers and to determine a reference virtual noise according to the receiver-end-actual noise of the subcarriers; and a line template module configured to configure DSL reference virtual noise parameter according to the reference virtual noise provided by the reference virtual voise determination device.

A computer readable storage medium recording the computer readable program, which enables a computing unit to execute the following methods:
obtaining a receiver-end-actual noise of DSL subcarriers; and
determining a reference virtual noise according to the obtained receiver-end-actual noise of the DSL subcarriers.

As seen from the above plan that, in the embodiments of the invention, in pre-configured conditions, a receiver-end-actual noise of a subcarriers is obtained and a reference virtual noise is determined according to the obtained receiver-end-actual noise of each subcarrier; and DSL reference virtual noise parameter is configured using the determined reference virtual noise. It can be seen that, in the embodiments of the invention, the reference virtual noise can be adjusted according to the receiver-end-actual noise of each subscriber on the DSL line, thereby increasing the accuracy of the reference virtual noise. Further, the configuration of the reference virtual noise can be made more accurate and reasonable, and to adapt to noise variations on the line when configuring the reference virtual noise parameter, thereby enhancing the stability of the line.

Furthermore, the scheme may be automatically implemented by an apparatus and network management system without men's intervening, thereby reducing the maintenance cost.

DETAILED DESCRIPTION OF THE EMBODIMENTS

In the embodiments of the invention, one or more groups of receiver-end-actual noises of DSL respective subcarriers are obtained and reference virtual noises are determined according to the obtained receiver-end-actual noises of the respective subcarriers. For example, receiver-end-actual noise maximum values of the corresponding subcarriers are selected from the obtained receiver-end-actual noises of respective subcarriers, and receiver-end-reference virtual noises of the corresponding subcarriers are obtained according to the selected receiver-end-actual noise maximum values of respective subcarriers; and/or, the receiver-end-actual noise maximum values of the corresponding subcarriers are selected from the obtained receiver-end-actual noises of respective subcarriers, and transmitter-end-reference virtual noises of the corresponding subcarriers are obtained according to the selected receiver-end-actual noise maximum values of respective subcarriers and attenuation features of the respective subcarriers obtained during a training process. Therefore, a transmitter-end-reference virtual noise parameter of DSL is configured using the obtained transmitter-end-reference virtual noises, or a receiver-end-reference virtual noise parameter of DSL is configured using the obtained receiver-end-reference virtual noises.

Figure 1:
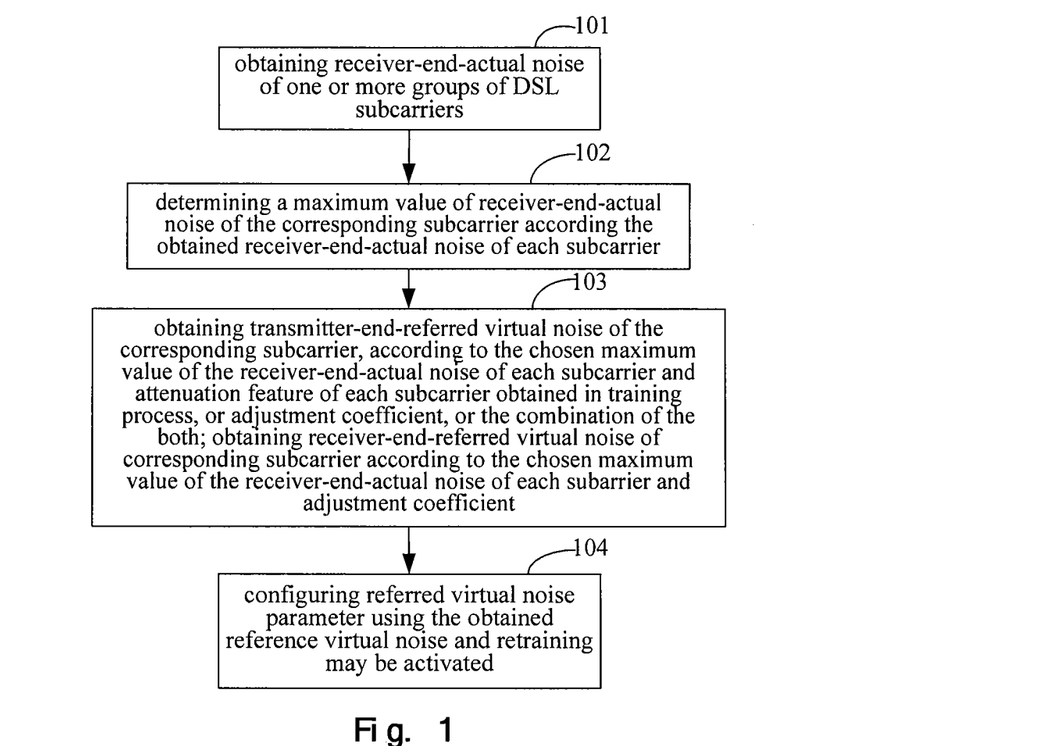
FIG. 1 is an illustrative flow chart of a method for configuring DSL reference virtual noise according to an embodiment of the invention.

FIG. 1 is an illustrative flow chart of a method for configuring DSL reference virtual noise according to an embodiment of the invention. As illustrated in FIG. 1, the flow includes the following steps:

In Step 101, one or more groups of receiver-end-actual noises of DSL respective subcarriers are obtained.

In the step, there are many methods for obtaining the one or more groups of receiver-end-actual noises of DSL respective subcarriers. According to context of the embodiments of the invention, a group of receiver-end-actual noises of respective subcarriers may be obtained by single time, or multiple groups of receiver-end-actual noises of respective subcarriers may be obtained by multiple times or by monitoring within a certain time period. For example, there are at least three methods as following:

The first method includes: enabling an on-line reconfiguration (OLR) feature in advance, and setting a monitoring time period; within the monitoring time period, collecting a parameter of each subcarrier after an on-line reconfiguration adjustment, calculating by utilizing the collected parameter of each subcarrier after the on-line reconfiguration adjustment and the parameter of each subcarrier obtained during a training process to obtain the receiver-end-actual noise of each subcarrier.

In DSL standard defines OLR feature, allowing the current configuration parameter to be automatically adjusted, without DSL' dropping, when there is slow change in the line condition or exterior noise environment, to ensure DSL' good performance and stability. OLR feature mainly includes Bit Swapping (BS), Dynamic Rate Repartition (DRR) and Seamless Rate Adaptation (SRA), etc.

BS is employed to reallocate bits (Bi, $0<i\leq$number of subcarriers) and gains (Gi, $0<i\leq$number of subcarriers) of respective subcarriers according to current signal to noise ratio of respective subcarriers, namely to adjust Bi and Gi, while an overall rate ($\Sigma$Lp) is kept unchanged. Lp is the bit number carried by the pth delay channel in each Physical Media Dependent (sublayer) (PMD) symbol; DRR is employed to reallocate bit number of each delay channel according to current signal to noise ratio of respective subcarriers, namely to adjust Lp, while the overall rate ($\Sigma$Lp) is kept unchanged. SRA is employed to reallocate bit number of each delay channel according to current signal to noise ratio of respective subcarriers, namely to adjust Lp, meanwhile adjusting bits and gains of respective subcarriers, in other word, adjusting Bi and Gi, and the overall rate ($\Sigma$Lp) may be changeable.

OLR feature allows the carried bit numbers and transmission powers of respective subcarriers to be adjusted during the activation process of the DSL in a certain extent during the activation process of a DSL according to the change of the line situation and a pre-configured target noise margin, so as to adapt to the line noise change and to ensure the line stability. In return, the OLR adjustment also reflects the noise change situation on the line. Therefore, by collecting parameters after OLR adjustment and a parameter of each subcarrier obtained during a training process, the magnitude of the current line noise, i.e. the receiver-end-actual noise of each subcarrier may be calculated. By means of a time period, such as the pre-configured monitoring time period, of statistic, the receiver-end-actual noise maximum noise values of respective subcarriers on the line may be obtained. Reference virtual noises may be determined according to the receiver-end-actual noise maximum noise values, and a DSL reference virtual noise parameter is configured using the determined reference virtual noises, to ensure that the line noise margin of the activated DSL can resist noise interferences that might occur.

The collected parameters of each subcarrier include a power spectrum density, a signal to noise ratio remainder and an allocated bit of each subcarrier; the parameters of each subcarrier obtained during a training process include an attenuation feature of each subcarrier. Or the collected parameters of each subcarrier include a signal to noise ratio remainder and an allocated bit and gain of each subcarrier; the parameters of each subcarrier obtained during a training process include an attenuation feature and a reference power spectrum density of each subcarrier.

The second method includes: pre-configuring a retraining monitoring time period or number of retraining times; collecting parameters of respective trained subcarriers during the retraining monitoring time period or within the number of retraining times; calculating using the collected parameters of respective subscribers and obtaining the receiver-end-actual noises of DSL respective subcarrier via calculation.

In the process of DSL training, the receiver end measures channel feature and obtain attenuation feature H log(i) of each subcarrier on the channel and the receiver-end-actual noise Actual_Received_Noise(i), thereby computing signal to noise ratio SNR(i) of each subcarrier and allocated bits (Bi, 0<i≤Number of subcarriers) and gains (Gi, 0<i≤Number of subcarriers) of respective subcarriers. In return, the transmitter end and the receiver end exchange parameters with each other by modulation mode and protocol instituted by standard, Bi, Gi, H log(i) of the receiver end is obtained and the receiver-end-actual noise Actual_Received_Noise(i) is calculated. Through multiple retraining, the maximum noise value of the receiver-end-actual noises of each subcarrier on the line can be obtained. A reference virtual noise can be determined according to the maximum noise value, and the DSL reference virtual noise parameter is configured using the determined reference virtual noise, to ensure that line noise margin of the activated DSL can resist noise interferences that might occur.

The collected parameters of each subcarrier after training may include a power spectrum density, a signal to noise ratio remainder, an allocated bit and an attenuation feature of each subcarrier; the collected parameters of each subcarrier after training may also include a signal to noise ratio remainder, an allocated bit, gain, an attenuation feature and a reference power spectrum density of each subcarrier.

The third method include: pre-configuring the number of times the double end line test (DELT) is performed; within the number of times the DELT is performed, the receiver-end-actual noise of each DSL subcarrier is obtained from the DELT test result.

In DSL defined the double end test (DELT) feature, the DELT feature is performed by entering Loop Diagnostic mode during DSL training process, and the output result of DELT includes parameters such as static noise QLN(i) on the line. The static noise is the receiver-end-actual noise of the corresponding DSL subcarrier. After performing DELT many times, the maximum noise value of the receiver-end-actual noises of each subcarrier on the line can be obtained. The reference virtual noise can be determined according to the maximum noise value, and the DSL reference virtual noise parameter are configured using the determined reference virtual noise, to ensure that line noise margin of the activated DSL can resist noise interferences that might occur.

Therefore, double end line test (DELT) is performed single time or multiple times in the method and the receiver-end-actual noise of each DSL subcarrier is obtained from the DELT test result.

In practical application, the above three methods may be combined, for example combining any two of them or the above three.

The process of determining the reference virtual noise according to the obtained receiver-end-actual noises of each subscriber includes:

Step 102, in which the receiver-end-actual noise maximum value of the corresponding subcarrier is determined according to the obtained receiver-end-actual noise of each subscriber.

In the embodiment, in order to select the receiver-end-actual noise maximum value of the corresponding subcarrier according to the obtained receiver-end-actual noises of each subcarrier, a receiver-end-actual noise record table may be pre-set. Optionally, the receiver-end-actual noise record table allows storing multiple groups each include the obtained receiver-end-actual noises of respective subcarriers. In this way, the receiver-end-actual noises of respective DSL subcarrier obtained each time in Step 101 may be stored directly into the receiver-end-actual noise record table, and receiver-end-actual noise maximum values of respective subcarriers are obtained by comparing multiple groups of the receiver-end-actual noises of respective subcarriers stored in the receiver-end-actual noise record table.

Optionally, after obtaining the receiver-end-actual noise of each DSL subcarrier each time in Step 101, the obtained receiver-end-actual noise of each subcarrier may be compared with the receiver-end-actual noise stored in the receiver-end-actual noise record table, and the greater one may be retained in the receiver-end-actual noise record table. So the receiver-end-actual noise of each subcarrier retained finally in the receiver-end-actual noise record table is the receiver-end-actual noise maximum value of each DSL subcarrier.

In Step 102, a receiver-end-actual noise sub-maximum value of the corresponding subcarrier may be selected from multiple groups of the receiver-end-actual noises of respective subcarriers obtained in Step 101, so as to use the receiver-end-actual noise sub-maximum value as the receiver-end-actual noise to calculate the reference virtual noise; also the multiple groups of receiver-end-actual noises of respective subcarriers obtained in Step 101 may be weighted on the corresponding subcarrier to obtain a receiver-end-actual noise weighted value of the corresponding subcarrier, which is used as the receiver-end-actual noise to calculate the reference virtual noise.

In Step 103, the transmitter-end-reference virtual noise of the corresponding subcarrier is obtained according to the selected receiver-end-actual noise maximum value of each subcarrier as well as at least one of the attenuation feature of each subcarrier obtained during the training process, and an adjustment coefficient, and/or the receiver-end-referred reference virtual noise of the corresponding subcarrier is obtained according to the selected receiver-end-actual noise maximum value of each subcarrier, and the adjustment coefficient.

In the step, the transmitter-end-reference virtual noise, and/or the receiver-end-reference virtual noise may be determined according to practical needs.

Hypothetically, the receiver-end-actual noise maximum value of the ith subcarrier is Actual_Received_Noise(i), and the transmitter-end-reference virtual noise of the ith subcarrier is TXREFVN(i), then TXREFVN(i)=Actual_Received_Noise(i)−H log(i)+α, in which 0<i≤the number of the subcarriers; hypothetically, the receiver-end-reference virtual noise is RXREFVN(i), then RXREFVN(i)=Actual_Received_Noise(i)+α, in which 0<i≤the number of the subcarriers.

H log(i), in which 0<i≤the number of the subcarriers, is the attenuation feature of ith subcarrier obtained during the training process, α being the adjustment coefficient, the value of which may be determined by empirical value, to adjust TXREFVN(i) or RXREFVN(i), and α may be any value in dB, the default value of which is 0 dB.

If in Step 102 the receiver-end-actual noise sub-maximum value of the corresponding subcarrier is selected, or the receiver-end-actual noise weighted value of the corresponding subcarrier obtained by weighting calculation of the obtained receiver-end-actual noise of each subcarrier on the corresponding subcarrier, then Actual_Received_Noise(i) in this step corresponds to the receiver-end-actual noise sub-maximum value and the receiver-end-actual noise weighted value, respectively.

In Step 104, the reference virtual noise parameter is configured using the obtained reference virtual noise, and the retraining may be activated.

The reference virtual noise is usually configured by virtue of a line template. If in Step 103 the transmitter-end-reference virtual noise is determined, the transmitter-end-reference virtual noise parameter of DSL is configured using the obtained reference virtual noise; and if in Step 103 the receiver-end-reference virtual noise is determined, the receiver-end-reference virtual noise parameter of DSL is configured using the obtained reference virtual noise.

Furthermore, between Step 103 and Step 104 can further includes the following step: the obtained reference virtual noise is updated and the updated reference virtual noise is determined to be the current reference virtual noise, i.e. the reference virtual noise needed to be configured this time. In practical implementation, the reference virtual noise needed to be configured this time may be determined according to reference virtual noise configured last time and the currently obtained reference virtual noise, for example the updated reference virtual noise may be obtained by a linear combination of the reference virtual noise configured last time and the currently obtained reference virtual noise. One of the situations is shown below:

For the transmitter-end-reference virtual noise, $RXREFVN(i)_{newp}=\beta*RXREFVN(i)_{oldp}+(1-\beta)*RXREFVN(i)_{new}$; for the receiver-end-reference virtual noise, $TXREFVN(i)_{newp}=\beta*TXREFVN(i)_{oldp}+(1-\beta)*TXREFVN(i)_{new}$.

Hereinto, $RXREFVN(i)_{new}$ and $TXREFVN(i)_{new}$ are the reference virtual noises obtained in Step 103, $RXREFVN(i)_{oldp}$ and $TXREFVN(i)_{oldp}$ are the reference virtual noise configured last time, $RXREFVN(i)_{newp}$ and $TXREFVN(i)_{newp}$ are reference virtual noise needed to be configured this time, in which β is an adjustment coefficient. If β is 0, in the new reference virtual noise the previous reference virtual noise is not considered.

In the above embodiment, the transmitter end is a user end and the receiver end is a central office end; or the transmitter end is a central office end and the receiver end is a user end. In practical application, Step 104 may be omitted if no configuration is needed. FIG. 1 with Step 104 omitted is a flow chart of a method for determining DSL transmitter-end-reference virtual noise in the invention.

In practical application, only obtaining the receiver-end-actual noise of one group of DSL subcarriers is allowable. Then the receiver-end-actual noise maximum value of the corresponding subcarrier is the obtained group of receiver-end-actual noise.

The method for configuring and the method for determining the DSL transmitter-end-reference virtual noise in the embodiments of the invention is described in detail above, a device for determining the DSL reference virtual noise in the embodiments of the invention will be described in detail below.

Figure 2:
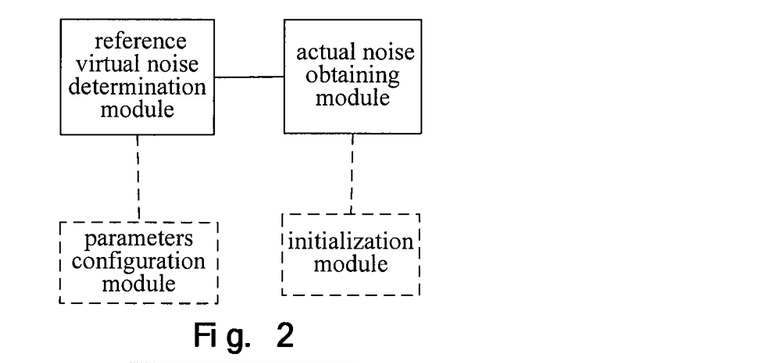
FIG. 2 is an illustrative structural chart of a device for determining DSL reference virtual noise according to an embodiment of the invention.

Referring to FIG. 2, it is an illustrative structural view of a device for determining DSL reference virtual noise according to an embodiment of the invention. As illustrated in solid line of FIG. 2, the device includes an actual noise obtaining module and a reference virtual noise determination module.

The actual noise obtaining module module is configured to obtain multiple groups of receiver-end-actual noises of DSL respective subcarriers and to provide data related to the obtained receiver-end-actual noises of the respective subscribers to the reference virtual noise determination module. According to the context, the data the actual noise obtaining module module provides to the reference virtual noise determination module may be the obtained receiver-end-actual noises of the respective subcarriers themselves, or the data obtained by processing the obtained receiver-end-actual noises of the respective subscribers. The processed data each include, for example, a receiver-end-actual noise maximum value obtained by statistics of receiver-end-actual noises within a certain time period or a pre-defined number of times.

In practical application, the actual noise obtaining module may also only obtain one group of receiver-end-actual noises of DSL respective subcarriers and provide the obtained receiver-end-actual noises of the respective subscribers to reference virtual noise determination module.

The reference virtual noise determination module is configured to determine the reference virtual noise according to the receiver-end-actual noise of each subscriber obtained by the actual noise obtaining module.

There are many implementing mode for the reference virtual noise determination module in practical implementation. In one of them, the reference virtual noise determination module includes:

A first reference virtual noise determination module, configured to select a receiver-end-actual noise maximum value of the corresponding subcarrier from the obtained receiver-end-actual noises of each subscriber, and to determine a transmitter-end-reference virtual noise of the corresponding subcarrier according to the selected receiver-end-actual noise maximum value of each subscriber and an attenuation feature of each subcarrier obtained during a training process. If the obtained receiver-end-actual noises of respective DSL subcarriers are in one group, this group of receiver-end-actual noises each may directly be the receiver-end-actual noise maximum value.

A second reference virtual noise determination module, select a receiver-end-actual noise maximum value of the corresponding subcarrier from the obtained receiver-end-actual noises of each subscriber, and to determine a receiver-end-reference virtual noise of the corresponding subcarrier according to the selected receiver-end-actual noise maximum value of each subscriber. If the obtained receiver-end-actual noises of respective DSL subcarriers are in one group, this group of receiver-end-actual noises each may directly be the receiver-end-actual noise maximum value.

In practical implementation, the above two modules may select a sub-maximum value of the receiver-end-actual noise of the corresponding subcarrier from the obtained receiverend-actual noise of each subscriber, or weight the obtained receiver-end-actual noise of each subcarrier on the corresponding subcarrier to obtain the receiver-end-actual noise weighted value of the corresponding subcarrier. If the obtained receiver-end-actual noises of respective DSL subcarriers are in one group, the sub-maximum value of the receiver-end-actual noise of the corresponding subcarrier is this obtained group of the receiver-end-actual noises.

Furthermore, the reference virtual noise determination module may further include a virtual noise updating module configured to update the determined reference virtual noise and take the updated reference virtual noise as the re-determined reference virtual noise of the corresponding subcarrier.

The updating process may be a linear combination using the previous configured reference virtual noise and the currently obtained reference virtual noise to obtain an updated reference virtual noise. One of them is shown below:

For the receiver-end-reference virtual noise, $RXREFVN(i)_{newp}=\beta*RXREFVN(i)_{oldp}+(1-\beta)*RXREFVN(i)_{new}$; For the transmitter-end-reference virtual noise, $TXREFVN(i)_{newp}=\beta*TXREFVN(i)_{oldp}+(1-\beta)*TXREFVN(i)_{new}$.

Here $RXREFVN(i)_{new}$ and $TXREFVN(i)_{new}$ are the reference virtual noises obtained by the second reference virtual noise determination module and the first reference virtual noise determination module according to the receiver-end-actual noise maximum value, and $RXREFVN(i)_{oldp}$ and $TXREFVN(i)_{oldp}$ are previous configured reference virtual noises, $RXREFVN(i)_{newp}$ and $TXREFVN(i)_{newp}$ are reference virtual noises needed to be configured this time and $\beta$ is an adjustment coefficient. If $\beta$ is 0, in the new reference virtual noise the previous reference virtual noise is not considered.

Furthermore, as illustrated by broken lines of FIG. 2, the device can further include a parameter configuration module configured to obtain the reference virtual noise determined by the reference virtual noise determination module, and to configure the DSL reference virtual noise parameter using the reference virtual noise. The obtained reference virtual noise is the transmitter-end-reference virtual noise and/or the receiver-end-reference virtual noise.

Furthermore, as illustrated by broken lines of FIG. 2, the device can further include an initialization module configured to configure the condition for obtaining the actual noise, the configuring the condition for obtaining the actual noise includes at least one of the followings: enabling the on-line reconfiguration feature and arranging a monitoring time period; retraining and arranging a retraining time period or the number of retraining times; and performing DELT test and arranging the number of test times.

The actual noise obtaining module operates to obtain the receiver-end-actual noise of one or more groups of DSL subcarriers according to the condition for obtaining the actual noise configured by the initialization module.

The following is a detail description on a system for configuring DSL reference virtual noise according to the embodiments of the invention.

Figure 3:
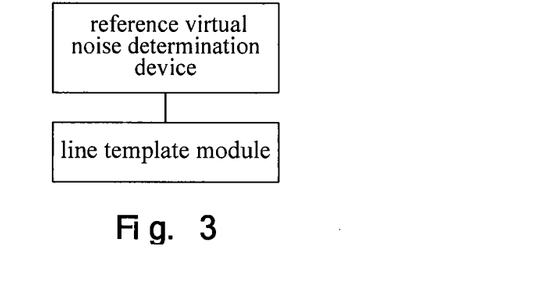
FIG. 3 is an illustrative structural chart of a system for configuring DSL reference virtual noise according to an embodiment of the invention.

Referring to FIG. 3, it is an illustrative structural view of a system for configuring DSL reference virtual noise according to an embodiment of the invention. As illustrated in FIG. 3, the system includes a reference virtual noise determination device and a line template module.

The reference virtual noise determination device is configured to obtain multiple groups of receiver-end-actual noises of DSL respective subcarriers, to determine a reference virtual noise according to the obtained the receiver-end-actual noise of each subcarrier, and to provide the determined reference virtual noise to the line template module. In practical application, the reference virtual noise determination device may also obtain only one group of receiver-end-actual noises of DSL respective subcarriers, to determine the reference virtual noise according to the obtained receiver-end-actual noise of each subcarrier, and to provide the determined reference virtual noise to the line template module.

There are many implementing ways for the reference virtual noise determination device to determine the reference virtual noise according to the obtained receiver-end-actual noises of each subscriber. For example, a receiver-end-actual noise maximum value or a receiver-end-actual noise sub-maximum value of the corresponding subcarrier may be selected from the obtained receiver-end-actual noises of each subcarrier, or the receiver-end-actual noises of each subcarrier are weighted on the corresponding subcarrier to obtain a receiver-end-actual noise weighted value of the corresponding subcarrier, and the reference virtual noise can be determined using the selected receiver-end-actual noise maximum value or receiver-end-actual noise sub-maximum value or the receiver-end-actual noise weighted value. If the obtained receiver-end-actual noises of DSL respective subcarriers are in one group, the group of receiver-end-actual noises each may directly be the receiver-end-actual noise to determine the reference virtual noise.

The reference virtual noise determination device of the system in FIG. 3 may be identical to that of FIG. 2. The only difference is that the device in FIG. 3 doesn't include the parameter configuration module, the function of the parameter configuration module being performed by the line template module exterior to the device.

The line template module is configured to configure DSL reference virtual noise parameter according to the reference virtual noises provided by the reference virtual noise determination device.

It can be seen that according to the embodiments of the invention, relevant parameters can be collected according to DSL operational situation, and the magnitude of the actual receiver-end-noise on DSL line is obtained according to the collected relevant parameters, therefore the magnitude of the reference virtual noise can be determined reasonably, and the setting of the reference virtual noise can be ensured to be reasonable and valid, thereby improving the line stability.

A method and device for determining, a method and system for configuring DSL reference virtual noise are described in detail below in conjunction with several embodiments and accompanying drawings. For the convenience of description, in practical implementation, the following embodiments are all based on the following example: selecting maximum values from the obtained multiple groups of receiver-end-actual noises of respective subcarriers. For situations of selecting sub-maximum values and performing weighting operation, the schemes in the following embodiments also apply, only needing to adapt the corresponding description.

A first embodiment:
The first method described in Step 101 shown in FIG. 1 is adopted in the first embodiment.

Figure 4:
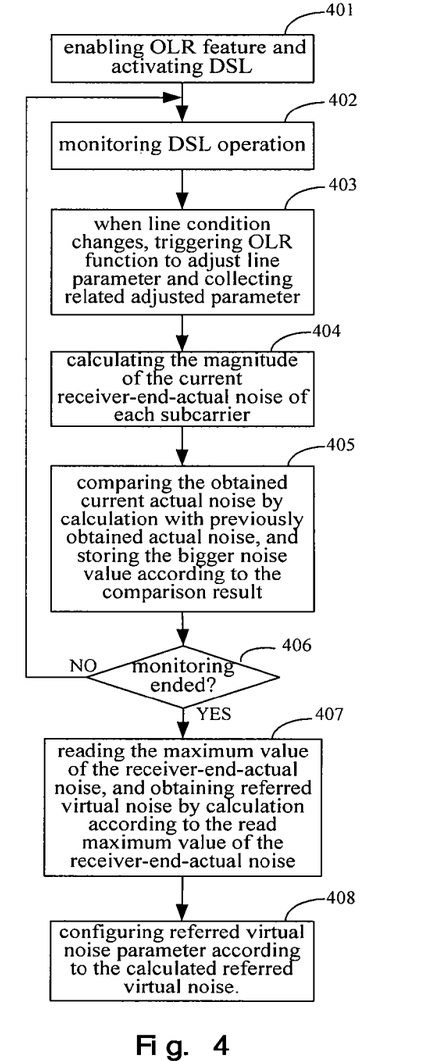
FIG. 4 is a flow chart of a method for configuring DSL reference virtual noise according to a first embodiment of the invention.

Referring to FIG. 4, it is a flow chart of a method for determining DSL reference virtual noise according to the first embodiment of the invention. As illustrated in FIG. 4, the flow includes the following steps:

Step 401, in which an OLR feature is enabled and DSL is activated. In the step, enabling the OLR feature may include BS, DRR and SRA, etc. and meanwhile selecting SNRM_MODE=1 or SNRM_MODE=2. When SNRM_MODE=1 is selected, an initial value of a transmitter-reference virtual noise TXREFVN needs not to be configured;

When SNRM_MODE=2 is selected, the initial value of TXREFVN needs to be configured, normally with a relatively small value like −140 dBm/Hz.

In Step 402, DSL operation is monitored.

In the embodiment, a monitoring time period may be set in advance.

In Step 403, when a line condition changes, an OLR function is triggered to adjust a line parameter and the relevant parameter is collected after the line parameter is adjusted. The relevant parameter may include a Power Spectrum Density (PSD(i), 0<i≤the number of the subcarriers), a Signal to noise ratio Remainder (SNRM(i), 0<i≤the number of the subcarriers), an allocated Bit (Bi, 0<i≤the number of the subcarriers) and Gain (Gi, 0<i≤the number of the subcarriers) of each respective subcarrier. In the step, a transmitter end may obtain the above relevant modulated parameters directly.

In Step 404, a magnitude of the receiver-end-actual noise of each subcarrier is calculated. In the step, there are the following two cases when the transmitter end calculates:

1) When SNRM_MODE=1, the activation of the DSL does not involve the virtual noise, and SNRM(i), 0<i≤the number of each respective subcarrier, in the relevant parameters obtained after adjustment in Step 403 is the actual Signal to noise ratio Remainder. The magnitude of the receiver-end-actual noise may be calculated according to the following formula:

$$\text{Actual\_Received\_Noise}(i) = \text{PSD}(i) + H\log(i) - \text{SNRM}(i) - Bi \times 3 - \Gamma$$

or according to the following formula:

$$\text{Actual\_Received\_Noise}(i) = \text{MREFPSD}(i) + Gi + H\log(i) - \text{SNRM}(i) - Bi \times 3 - \Gamma$$

Γ is Signal to noise ratio Gap (SNR GAP) which is a constant of 9.75 dB; H log(i), 0<i≤the number of each respective subcarrier, is an attenuation feature of each respective subcarrier obtained during a training process; MREFPSD(i), 0<i≤the number of each respective subcarrier, is a reference power spectrum density of each respective subcarrier obtained during the training process.

Accordingly, PSD(i) is a power spectrum density of the ith subcarrier in dBm/Hz, H log(i) is the attenuation feature of the ith subcarrier in dB obtained during the training process; SNRM(i) is Signal to noise ratio Remainder of the ith subcarrier in dB; Bi is a bit allocated to the ith subcarrier with Bi×3 in dB; Gi is a gain of the ith subcarrier in dB; MREFPSD(i) is the reference power spectrum density of the ith subcarrier in dBm/Hz obtained during the training process.

2) When SNRM_MODE=2, the activation of the DSL involves the virtual noise, and SNRM(i), 0<i≤the number of each respective subcarriers, in the relevant parameters obtained after adjustment in Step 403 is the Signal to noise ratio Remainder involving the virtual noise. If the transmitter-end-reference virtual noise is to be determined, the magnitude of the receiver-end-actual noise can be calculated according to the following formula:

$$\text{Actual\_Received\_Noise}(i) = \max\{\text{PSD}(i) - \text{SNRM}(i) - \text{TXREFVN}(i) - Bi \times 3 - \Gamma, \text{PSD}(i) + H\log(i) - \text{SNRM}(i) - Bi \times 3 - \Gamma\}$$

If the transmitter-end-reference virtual noise is to be determined, the magnitude of the receiver-end-actual noise can also be calculated according to the following formula:

$$\text{Actual\_Received\_Noise}(i) = \max\{\text{MREFPSD}(i) + Gi - \text{SNRM}(i) - \text{TXREFVN}(i) - Bi \times 3 - \Gamma, \text{MREFPSD}(i) + Gi + H\log(i) - \text{SNRM}(i) - Bi \times 3 - \Gamma\}$$

If the receiver-end-reference virtual noise is to be determined, the magnitude of the receiver-end-actual noise can also be calculated according to the following formula:

$$\text{Actual\_Received\_Noise}(i) = \max\{\text{PSD}(i) + H\log(i) - \text{SNRM}(i) - \text{RXREFVN}(i) - Bi \times 3 - \Gamma, \text{PSD}(i) + H\log(i) - \text{SNRM}(i) - Bi \times 3 - \Gamma\}$$

If the receiver-end-reference virtual noise is to be determined, the magnitude of the receiver-end-actual noise can also be calculated according to the following formula:

$$\text{Actual\_Received\_Noise}(i) = \max\{\text{MREFPSD}(i) + Gi + H\log(i) - \text{SNRM}(i) - \text{RXREFVN}(i) - Bi \times 3 - \Gamma, \text{MREFPSD}(i) + Gi + H\log(i) - \text{SNRM}(i) - Bi \times 3 - \Gamma\}$$

If the transmitter-end-reference virtual noise and the receiver-end-reference virtual noise are to be determined, calculation can be performed according to the above corresponding formulas, and the respective obtained values can be retained.

In the above formulas, max{ } is a function for taking the maximum value; Γ is SNR GAP, being a constant of 9.75 dB; H log(i), 0<i≤the number of each respective subcarrier, is the attenuation feature of each respective subcarrier obtained in the training process; MREFPSD(i), 0<i≤the number of each respective subcarrier, is the reference power spectrum density of each respective subcarrier obtained in the training process; TXREFW(i), 0<i≤the number of each respective subcarrier, is the transmitter-end-reference virtual noise of each subcarrier; RXREFVN (i), 0<i≤the number of each respective subcarrier, is the receiver-end-reference virtual noise of each respective subcarrier.

Accordingly, PSD(i) is the Power Spectrum Density of the ith subcarrier in dBm/Hz, H log(i) is the attenuation feature of the ith subcarrier in dB obtained during the training process; SNRM(i) is the Signal to noise ratio Remainder of the ith subcarrier in dB; Bi is the bit allocated to the ith subcarrier, with Bi×3 in dB; Gi is the gain of the ith subcarrier in dB; TXREFVN(i) is the transmitter-end-reference virtual noise of the ith subcarrier in dBm/Hz; RXREFVN(i) is the receiver-end-reference virtual noise of the ith subcarrier in dBm/Hz. MREFPSD(i) is the reference power spectrum density of the ith subcarrier in dBm/Hz obtained during the training process.

In Step 405, the current actual noise obtained from the calculation in Step 404 is compared with previously obtained actual noise, and the bigger noise value is stored according to the comparison result.

In the embodiment, if there is a receiver-end-actual noise record table pre-set in the system. After each OLR occurrence, the current actual noise obtained in Step 404 is compared with the value in the actual noise record table, and the bigger one is stored in the table. If the actual noise obtained the first time is the bigger one, then the actual noise of each subcarrier is directly stored into the table.

When SNRM_MODE=2, if the transmitter-end-reference virtual noise and the receiver-end-reference virtual noise are to be determined, the receiver-end-actual noise record table is in two copies, and the respective retained values in Step 404 are compared with the corresponding actual noise record table respectively.

In Step 406, it is determined whether the monitoring ends, and if it ends, the process goes to Step 407, and if it does not ends, the process returns to Step 402.

In the embodiment, if a monitoring time period is set, the monitoring ends when reaching the monitoring time period.

In Step 407, the receiver-end-actual noise maximum value is read and the reference virtual noise is obtained by calculation according to the read receiver-end-actual noise maximum value.

In the embodiment, if a receiver-end-actual noise record table is pre-set in the system and the bigger receiver-end-actual noise value is stored each time in the receiver-end-actual noise record table in Step 405, in the step the stored receiver-end-actual noise value can be directly read from the receiver-end-actual noise record table, as the receiver-end-actual noise maximum value.

In the step, if the receiver-end-actual noise maximum value of the ith subcarrier is recorded as Actual_Received_Noise(i), the transmitter-end-reference virtual noise of the ith subcarrier is TXREFVN(i)=Actual_Received_Noise(i)−H log(i)+α, 0<i≤the number of the subcarriers;

The receiver-end-reference virtual noise of the ith subcarrier is RXREFVN(i)=Actual_Received_Noise(i)+α.

H log(i), 0<i≤the number of the subcarriers, is the attenuation feature of each subcarrier obtained during the training process. α is an adjustment coefficient, the value of which may be determined empirically, to adjust TXREFVN(i) or RXREFVN(i). α may be any value in dB, with default value being 0 dB.

Accordingly, TXREFVN(i) is the transmitter-end-reference virtual noise of the ith subcarrier, RXREFVN(i) is the receiver-end reference virtual noise of the ith subcarrier in dBm/Hz; Actual_Received_Noise(i) is the receiver-end-actual noise maximum value of the ith subcarrier in dBm/Hz; H log(i) is the attenuation feature of the ith subcarrier obtained in the training process in dB.

In Step 408, a reference virtual noise parameter of the DSL is configured according to the calculated reference virtual noise.

In Step 408, a transmitter-end-reference virtual noise parameter of the DSL may be configured according to TAREFVN(i), 0<i≤the number of each respective subcarriers, obtained in Step 407. When configuring the transmitter-end-reference virtual noise parameter, SNRM_MDOE=2 needs to be configured, and thereafter retraining may be activated, while returning to Step 402.

In Step 408, a receiver-end-reference virtual noise parameter of the DSL may be configured according to RXREFVN(i), 0<i≤the number of each respective subcarriers, obtained in Step 407, and thereafter retraining may be active, while returning to Step 402.

In Step 408, the transmitter-end-reference virtual noise and the receiver-end-reference virtual noise may be configured respectively according to TXREFVN(i) and RXREFVN(i), 0<i≤the number of each respective subcarriers, obtained in Step 407. The configuration process may refer to the above description.

In the above process, Step 405 may also include storing the current actual noise obtained in Step 404. If there is a receiver-end-actual noise record table pre-set in the system, then after each occurrence of OLR, the current actual noise obtained in Step 404 is stored in the actual noise record table. When obtaining the receiver-end-actual noise maximum value in Step 407, the receiver-end-actual noise maximum value may be selected from the actual noise record table.

In the above process, Step 408 may be omitted if no configuration is needed. FIG. 4 with Step 408 omitted is a flow chart of a method for determining the transmitter-end-reference virtual noise of the DSL of the invention.

The method for configuring and the method for determining DSL reference virtual noise according to embodiment 1 of the invention is described in detail as above. The following is a detailed description of a device for determining DSL reference virtual noise according to embodiment 1 of the invention.

The composition, connection relations and function of devices according to the embodiment is consistent with the description of devices illustrated in FIG. 2. The difference lies in FIG. 5 for implementation, which is the internal structural view of an actual noise obtaining module in a device for determining the DSL reference virtual noise according to the first embodiment of the invention. The actual noise obtaining module may include an adjustment parameter obtaining module, an actual noise calculation module and a storage module.

Figure 5:
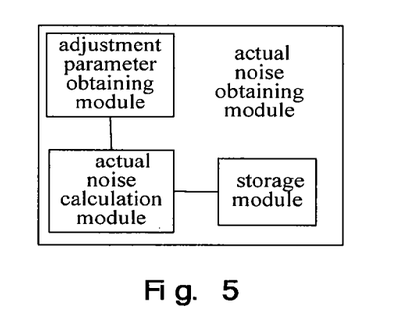
FIG. 5 is an internal structural view of an actual noise obtaining module in a device for determining DSL reference virtual noise according to a first embodiment of the invention.

The adjustment parameter obtaining module, when enabling online reconfiguration feature OLR, in pre-set condition, is configured to obtain parameters of each subcarrier after line parameters adjustment by OLR function triggered due to line change, and to provide the obtained parameters to actual noise calculation module.

The actual noise calculation module is configured to obtain a receiver-end-actual noise of each DSL subcarrier by calculation and to provide the calculated receiver-end-actual noise to the storage module for storage, according to the parameters of each subcarrier provided by the adjustment parameter obtaining module and the parameters of each subcarrier obtained in a training process.

The storage module is configured to store the receiver-end-actual noise of each subcarrier provided by the actual noise obtaining module. The receiver-end-actual noise stored in the storage module may be the receiver-end-actual noise provided each time by the actual noise calculation module, and also may be the greater receiver-end-actual noise value after comparing the current receiver-end-actual noise provided by the actual noise calculation module with previously stored receiver-end-actual noise.

A reference virtual noise determination module is configured to obtain the receiver-end-actual noise maximum value from the storage module and determine the reference virtual noise according to the obtained receiver-end-actual noise maximum value.

A second embodiment:

The second method described in Step 101 shown in FIG. 1 is adopted in the second embodiment.

Figure 6:
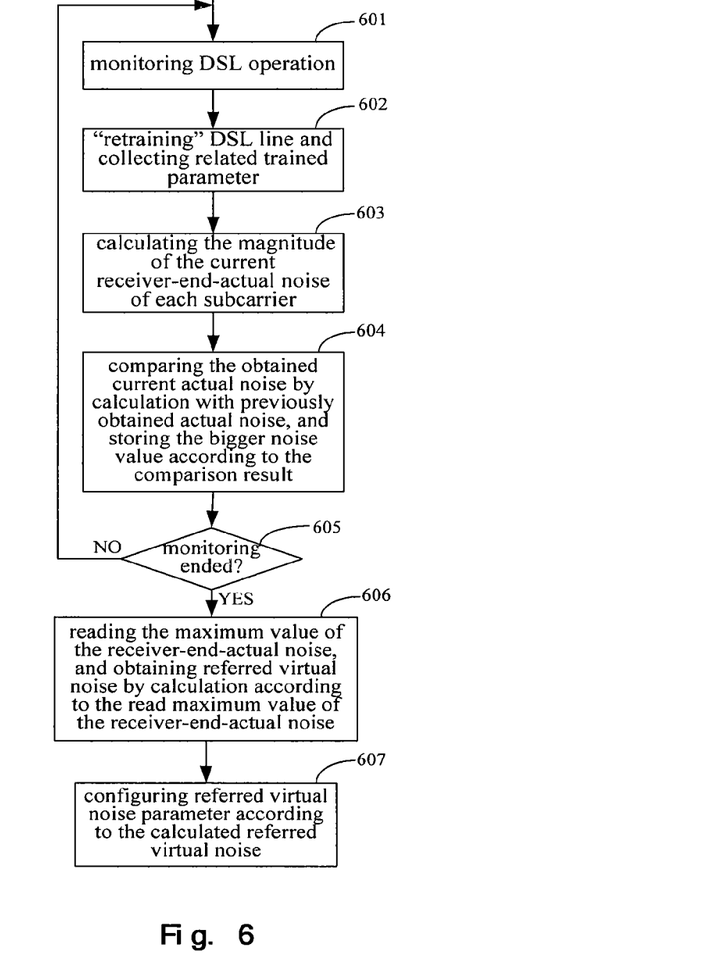
FIG. 6 is a flow chart of a method for configuring DSL reference virtual noise according to a second embodiment of the invention.

Referring to FIG. 6, it is a flow chart of a method for configuring the DSL reference virtual noise according to the second embodiment of the invention. As illustrated in FIG. 6, the flow includes the following steps:

In Step 601, DSL operation is monitored.

In the embodiment, in "multiple retraining", the number of training times may be set. Within the number of training times the DSL operation is monitored and the DSL is retrained; or a monitoring time period may be set, during which the DSL operation is monitored, including an activation of monitoring DSL and collection of related parameters, etc.

In Step 602, DSL line is retrained and relevant parameters after training is collected. The related parameters after training may include a Power Spectrum Density of each subcarrier (PSD(i), 0<i≤the number of the subcarriers), Signal to noise ratio Remainder (SNRM(i), 0<i≤the number of the subcarriers), an allocated Bit (Bi, 0<i≤the number of the subcarriers) and a Gain (Gi, 0<i≤the number of the subcarriers) and an attenuation feature (H log(i), 0<i≤the number of the subcarriers). In the step, the transmitter end obtains the relevant parameters after training from the receiver end.

In Step 603, the magnitude of the current receiver-end-actual noise of each subcarrier is calculated.

In the step, there are the following two situations when the transmitter end calculates:

1) When SNRM_MODE=1, the activation of the DSL does not involve the virtual noise, then SNRM(i), 0<i≤the number of the subcarriers, in the related parameters in Step 602 is the actual Signal to noise ratio Remainder. The magnitude of the receiver-end-actual noise may be calculated according to the following formula:

$$\text{Actual\_Received\_Noise}(i) = \text{PSD}(i) + H\log(i) - \text{SNRM}(i) - Bi \times 3 - \Gamma$$

The magnitude of the receiver-end-actual noise may also be calculated according to the following formula:

$$\text{Actual\_Received\_Noise}(i) = \text{MREFPSD}(i) + Gi + H\log(i) - \text{SNRM}(i) - Bi \times 3 - \Gamma$$

$\Gamma$ is Signal to noise ratio GAP (SNR GAP), being a constant of 9.75 dB; $H\log(i)$, 0<i≤the number of the subcarriers, is an attenuation feature of each respective subcarrier obtained during a training process; MREFPSD(i), 0<i≤the number of each respective subcarriers, is a reference power spectrum density of each respective subcarrier obtained during the training process. Accordingly, PSD(i) is a Power Spectrum Density of the ith subcarrier in dBm/Hz; $H\log(i)$ is an attenuation feature of the ith subcarrier in dB obtained in the training process; SNRM(i) is Signal to noise ratio Remainder of the ith subcarrier in dB; Bi is a bit assigned to the ith subcarrier, with Bi×3 in dB; Gi is a gain of the ith subcarrier in dB; MREFPSD(i) is the reference power spectrum density of the ith subcarrier in dBm/Hz obtained in the training process.

2) When SNRM_MODE=2, the activation of the DSL involves the virtual noise into, then SNRM(i), 0<i≤the number of each respective subcarrier, in the relevant parameters in Step 602 is the Signal to noise ratio Remainder involving the virtual noise.

If the transmitter-end-reference virtual noise is to be determined, the magnitude of the receiver-end-actual noise may be calculated according to the following formula:

$$\text{Actual\_Received\_Noise}(i) = \max\{\text{PSD}(i) - \text{SNRM}(i) - \text{TXREFVN}(i) - Bi \times 3 - \Gamma, \text{PSD}(i) + H\log(i) - \text{SNRM}(i) - Bi \times 3 - \Gamma\}$$

If the transmitter-end-reference virtual noise is to be determined, the magnitude of the receiver-end-actual noise may also be calculated according to the following formula:

$$\text{Actual\_Received\_Noise}(i) = \max\{\text{MREFPSD}(i) + Gi - \text{SNRM}(i) - \text{TXREFVN}(i) - Bi \times 3 - \Gamma, \text{MREFPSD}(i) + Gi + H\log(i) - \text{SNRM}(i) - Bi \times 3 - \Gamma\}$$

If the receiver-end-reference virtual noise is to be determined, the magnitude of the receiver-end-actual noise may be calculated according to the following formula:

$$\text{Actual\_Received\_Noise}(i) = \max\{\text{PSD}(i) + H\log(i) - \text{SNRM}(i) - \text{RXREFVN}(i) - Bi \times 3 - \Gamma, \text{PSD}(i) + H\log(i) - \text{SNRM}(i) - Bi \times 3 - \Gamma\}$$

If the receiver-end-reference virtual noise is to be determined, the magnitude of the receiver-end-actual noise may also be calculated according to the following formula:

$$\text{Actual\_Received\_Noise}(i) = \max\{\text{MREFPSD}(i) + Gi + H\log(i) - \text{SNRM}(i) - \text{RXREFVN}(i) - Bi \times 3 - \Gamma, \text{MREFPSD}(i) + Gi + H\log(i) - \text{SNRM}(i) - Bi \times 3 - \Gamma\}$$

If the transmitter-end-reference virtual noise and the receiver-end-reference virtual noise are to be determined, calculation can be performed according to the above corresponding formulas, and the respective obtained values can be retained.

In the above formulas, max{ } is a function for taking the maximum value; $\Gamma$ is SNR GAP, being a constant of 9.75 dB; $H\log(i)$, 0<i≤the number of the subcarriers, is the attenuation feature of each respective subcarrier obtained during the training process; MREFPSD(i), 0<i≤the number of each respective subcarrier, is the reference power spectrum density of each respective subcarrier obtained during the training process; TXREFVN(i), 0<i≤the number of each respective subcarrier, is the transmitter-end-reference virtual noise of each respective subcarrier; RXREFVN(i), 0<i≤the number of each respective subcarrier, is the receiver-end-reference virtual noise of each respective subcarrier.

Accordingly, PSD(i) is the Power Spectrum Density of the ith subcarrier in dBm/Hz, $H\log(i)$ is the attenuation feature of the ith subcarrier in dB obtained in the training process; SNRM(i) is the Signal to noise ratio Remainder of the ith subcarrier in dB; Bi is the bit assigned to the ith subcarrier, with Bi×3 in dB; Gi is the gain of the ith subcarrier in dB; TXREFVN(i) is the transmitter-end-reference virtual noise of the ith subcarrier in dBm/Hz; RXREFVN(i) is the receiver-end-reference virtual noise of the ith subcarrier in dBm/Hz. MREFPSD(i) is the reference power spectrum density of the ith subcarrier in dBm/Hz obtained in the training process.

In Step 604, the current actual noise obtained in Step 603 is compared with previously obtained actual noise, and the bigger noise value is stored according to the comparison. In the embodiment, if there is a receiver-end-actual noise record table pre-stored in the system, the current actual noise obtained in Step 603 is compared with a value in the record table after each training, and the bigger noise value is stored in the table. If the actual noise obtained the first time is the bigger one, the actual noise of each subcarrier is stored directly into the table. When SNRM_MODE=2, if the transmitter-end-reference virtual noise and receiver-end-reference virtual noise are to be determined, the receiver-end-actual noise record table is in two copies, and the respective values retained in Step 404 are compared with the corresponding actual noise record table respectively.

In Step 605, it is determined whether the monitoring is ended. If the monitoring is ended, step 606 is performed; and if the monitoring is not ended, the process may return to step 601.

In the embodiment, if a monitoring time period is set, the monitoring ends when reaching the monitoring time period; if the number of retraining times is set, the monitoring ends when reaching the number of retraining times.

In Step 606, the receiver-end-actual noise maximum value is read and the reference virtual noise is obtained by calculation according to the read receiver-end-actual noise maximum value.

In the embodiment, if a receiver-end-actual noise record table is pre-set in the system, and the bigger receiver-end-actual noise value is stored each time in the receiver-end-actual noise record table in Step 604, then in this step the stored receiver-end-actual noise value may be read directly from the receiver-end-actual noise record table as the receiver-end-actual noise maximum value. In the step, if the receiver-end-actual noise maximum value of the ith subcarrier is recorded as Actual_Received_Noise(i), the transmitter-end-reference virtual noise of the ith subcarrier is TXREFVN(i)=Actual_Received_Noise(i)−$H\log(i)$+α, 0<i≤the number of the subcarriers; the receiver-end-reference virtual noise of the ith subcarrier is RXREFVN(i)=Actual_Received_Noise(i)+α. $H\log(i)$, 0<i≤the number of the subcarriers, is the attenuation feature of each respective subcarrier obtained during the training process. α is an adjustment coefficient, the value of which may be determined empirically, to adjust TXREFVN(i) or RXREFVN(i). α may be any value in dB, with default value being 0 dB.

Accordingly, TXREFVN(i) is the transmitter-end-reference virtual noise of the ith subcarrier, RXREFVN(i) is the receiver-end-reference virtual noise of the ith subcarrier in dBm/Hz; Actual_Received_Noise(i) is the receiver-end-actual noise maximum value of the ith subcarrier in dBm/Hz; H log(i) is the attenuation feature of ith subcarrier obtained in the training process in dB.

In Step 607, a reference virtual noise parameter of the DSL is configured according to the calculated reference virtual noise.

In the step, a transmitter-end-reference virtual noise parameter of the DSL is configured according to TXREFVN(i), 0<i≤the number of the subcarriers, obtained in Step 606. When configuring the transmitter-end-reference virtual noise parameter, SNRM_MODE=2 needs to be configured, and thereafter retraining may be activated, while returning to step 601.

Optionally, a receiver-end-reference virtual noise parameter of the DSL is configured according to RXREFVN(i), 0<i≤the number of the subcarriers, obtained in Step 606, and thereafter retraining may be activated, while returning to step 601.

Optionally, the transmitter-end-reference virtual noise parameter and the receiver-end-reference virtual noise parameter are configured according to TXREFVN(i) and RXREFVN(i), 0<i≤the number of each respective subcarrier, obtained in Step 606. The configuration process may refer to the above description.

In the above process, Step 604 may also include storing current actual noise obtained in Step 603. If there is a receiver-end-actual noise record table pre-set in the system, then after each occurrence of OLR, the current actual noise obtained in Step 603 is stored in the actual noise record table. When in step 606 the receiver-end-actual noise maximum value is to be obtained, the receiver-end-actual noise maximum value may be selected from the actual noise record table.

In the above process, Step 607 may be omitted if no configuration is needed. FIG. 6 with step 607 omitted is a flow chart of a method for determining the transmitter-end-reference virtual noise of the DSL of the invention.

The method for configuring and the method for determining the DSL reference virtual noise according to the second embodiment of in the invention is described in detail as above. The following is a detailed description of a device for determining the DSL reference virtual noise according to the second embodiment of the invention.

The composition, connection relations and function of devices according to the embodiment is consistent with the description of devices illustrated in FIG. 2. The difference lies in FIG. 7 for implementation, which is the internal structural view of an actual noise obtaining module in a device for determining the DSL reference virtual noise according to the second embodiment of the invention. The actual noise obtaining module may include a training parameter obtaining module, an actual noise calculation module and a storage module.

Figure 7:
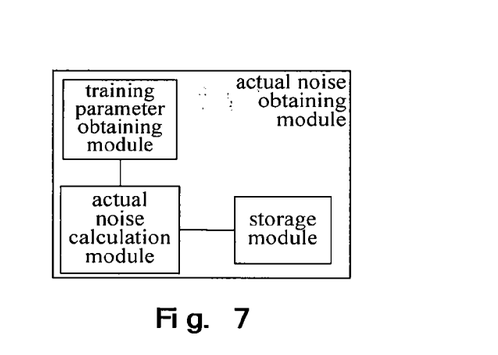
FIG. 7 is an internal structural view of an actual noise obtaining module in a device for determining DSL reference virtual noise according to a second embodiment of the invention.

The training parameter obtaining module is configured to, during retraining process, under pre-configured condition, obtain a parameter of each subcarrier after training and provide the obtained parameter to the actual noise calculation module.

The actual noise calculation module is configured to obtain the receiver-end-actual noise of each DSL subcarrier by calculation according to the parameter of each subcarrier provided by the training parameter obtaining module, and to provide the calculated receiver-end-actual noise to the storage module for storage The storage module is configured to store the receiver-end-actual noise of each subcarrier provided by the actual noise obtaining module. The receiver-end-actual noise stored in the storage module may be the receiver-end-actual noise provided each time by the actual noise calculation module, or the bigger value of the receiver-end-actual noise after comparing the current receiver-end-actual noise provided by the actual noise calculation module and previously stored receiver-end-actual noise.

A reference virtual noise determination module is configured to obtain the receiver-end-actual noise maximum value of each subcarrier according to records in the storage module, and to determine the reference virtual module according to the obtained receiver-end-actual noise maximum value.

The third embodiment:

In the embodiment, the third method described in Step 101 of the flow illustrated in FIG. 1 is adopted.

Figure 8:
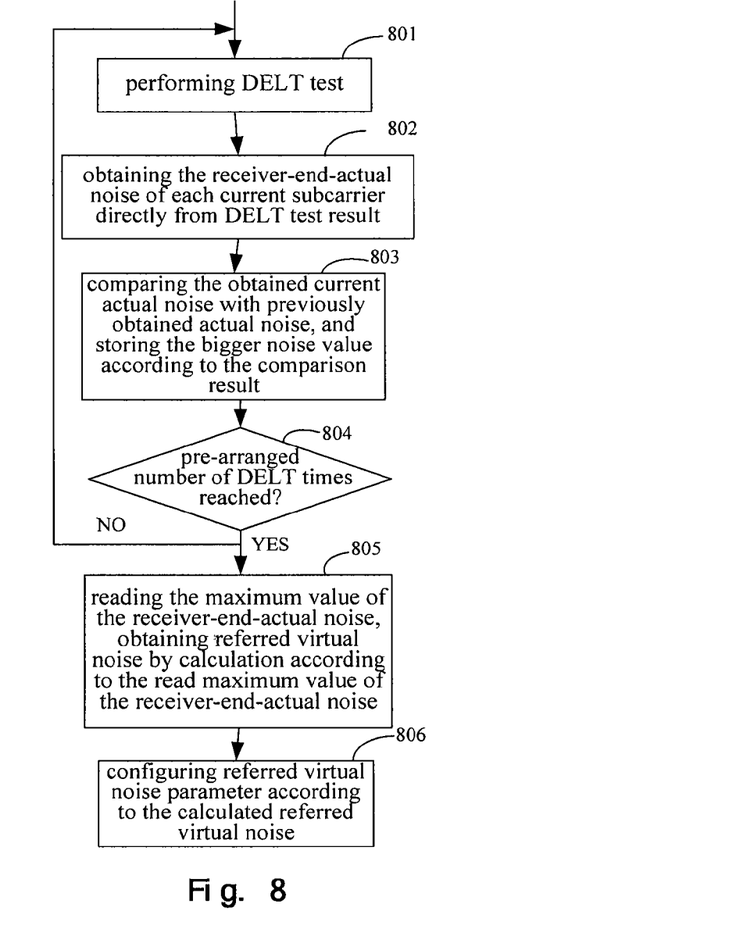
FIG. 8 is a flow chart of a method for configuring DSL reference virtual noise according to a third embodiment of the invention.

Referring to FIG. 8, it is a flow chart of a method for configuring the DSL reference virtual noise according to the third embodiment of the invention. As illustrated in FIG. 8, the flow includes the following steps:

In Step 801, a DELT test is performed.

In the embodiment, a number of the DELT test times may be pre-set.

In Step 802, current receiver-end-actual noise of each subcarrier is obtained directly from the DELT test result.

In the DELT test result, the actual noise (QLN(i), 0<i≤the number of the subcarriers), of each subcarrier of the receiver is outputted directly, with QLN(i), 0<i≤the number of the subcarriers, being the current receiver-end-actual noise of each subcarrier. The receiver sends the receiver-end-actual noise of each subcarrier outputted from the DELT test result to the transmitter.

In Step 803, the current actual noise obtained in Step 802 is compared with previously obtained actual noise, and the bigger noise value is stored according to the comparison result. In the embodiment, if there is a receiver-end-actual noise record table pre-set in the transmitter system, then after each DELT test, the transmitter end compares the current actual noise obtained in Step 802 with the value in the actual noise record table, and the bigger noise value is stored in the table. If the actual noise obtained the first time is the bigger one, the actual noise of each subcarrier is directly stored in the table.

In Step 804, it is determined whether the pre-set number of the DELT times is reached, and if it is reached, step 805 is performed; and if it is not reached, the process may return to step 801.

In Step 805, the receiver-end-actual noise maximum value is read and the reference virtual noise is obtained by calculation according to the read receiver-end-actual noise maximum value.

In the embodiment, if a receiver-end-actual noise record table is pre-set in the system, and the bigger receiver-end-actual noise value is stored each time in the receiver-end-actual noise record table in Step 803, then in this step the stored receiver-end-actual noise value may be read directly from the receiver-end-actual noise record table, as the receiver-end-actual noise maximum value. In the step, if the receiver-end-actual noise maximum value of the ith subcarrier is recorded as Actual_Received_Noise(i), the transmitter-end-reference virtual noise of the ith subcarrier is TXREFVN(i)=Actual_Received_Noise(i)−H log(i)+α, 0<i≤the number of the subcarriers; the receiverend-reference virtual noise of the ith subcarrier is RXREFVN(i)=Actual_Received_Noise(i)+α.

H log(i), 0<i≤the number of the subcarriers, is the attenuation feature of each subcarrier obtained in the training process. α is an adjustment coefficient, the value of which may be determined empirically, to adjust TXREFVN(i) or RXREFVN(i). α may be any value in dB with default value being 0 dB.

Accordingly, TXREFVN(i) is transmitter-end reference virtual noise of the ith subcarrier, RXREFVN(i) is the receiver-end reference virtual noise of the ith subcarrier in dBm/Hz; Actual_Received_Noise(i) is the receiver-end-actual noise maximum value of the ith subcarrier in dBm/Hz; H log(i) is the attenuation feature of the ith subcarrier obtained in the training process in dB.

In Step 806, the reference virtual noise of the DSL is configured according to the calculated reference virtual noise.

In Step 806, a transmitter-end reference virtual noise parameter of the DSL may be configured according to TXREFVN(i), 0<i≤the number of the subcarriers, obtained in Step 805. When configuring the transmitter-end reference virtual noise parameter, SNRM_MDOE=2 needs to be configured, and thereafter retraining may be activated and the number of the DELT test times is re-set, then returning to Step 801.

In Step 806, a receiver-end-reference virtual noise parameter may be configured according to RXREFVN(i), 0<i≤the number of the subcarriers, obtained in Step 805, and thereafter retraining may be activated, and returning to Step 801.

In Step 806, the transmitter-end-reference virtual noise and receiver-end-reference virtual noise may be configured respectively according to TXREFVN(i) and RXREFVN(i), 0<i≤the number of the subcarriers, obtained in Step 805. Referring to the above text for the configuration process.

In the above process, Step 803 may also include storing the current actual noise obtained in Step 802. If there is a receiver-end-actual noise record table is pre-set in the system, then after each occurrence of OLR, the current actual noise obtained in Step 802 is stored in the actual noise record table. When obtaining the receiver-end-actual noise maximum value in Step 805, the receiver-end-actual noise maximum value may be selected from the actual noise record table.

In the above embodiment, Step 806 may be omitted if no configuration is needed. FIG. 8 with Step 806 omitted is a flow chart of a method for determining the DSL transmitter-end-reference virtual noise of the invention.

The method for configuring and the method for determining the DSL reference virtual noise according to the third embodiment of the invention are described in detail as above. The following is a detailed description of a device for determining the DSL reference virtual noise according to the third embodiment of the invention.

The composition, connection relations and function of devices according to the embodiment is consistent with the description of devices illustrated in FIG. 2. The difference lies in FIG. 9 for implementation, which is the internal structural view of an actual noise obtaining module in a device for determining the DSL reference virtual noise according to the first embodiment of the invention. The actual noise obtaining module may include a DELT result obtaining module, an actual noise determination module and a storage module.

Figure 9:
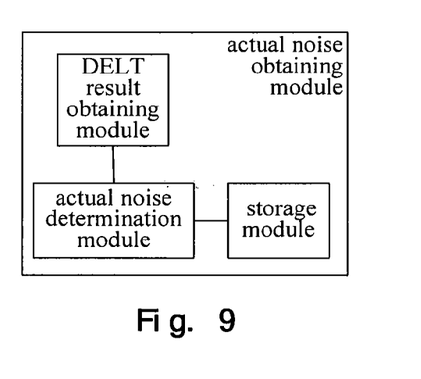
FIG. 9 is an internal structural view of an actual noise obtaining module in a device for determining DSL reference virtual noise according to a third embodiment of the invention.

The DELT result obtaining module is configured to obtain a DELT test result and to provide the obtained DELT test result to the actual noise determination module.

The actual noise determination module is configured to obtain the receiver-end-actual noises of DSL respective subcarriers from the DELT test result provided by the DELT result obtaining module and to provide the obtained receiver-end-actual noises to storage module for storage.

The storage module is configured to store the receiver-end-actual noises of respective subcarriers provided by the actual noise determination module. The receiver-end-actual noise stored in the storage module may be the receiver-end-actual noises provided each time by the actual noise calculation module, or the bigger value of the receiver-end-actual noises obtained by comparison of the current receiver-end-actual noises provided by the actual noise calculation module with previously stored receiver-end-actual noise.

The reference virtual noise determination module is configured to obtain the receiver-end-actual noise maximum value of each subcarrier according to the record stored by the storage module and determine the reference virtual noise according to the obtained receiver-end-actual noise maximum value.

The configuration system in the above three embodiments may be consistent with the description of the system illustrated in FIG. 3.

The method in the above three embodiments may be consistent with the description of FIG. 1. Furthermore, the updating process may be performed by using the obtained reference virtual noise and the updated reference virtual noise is determined to be the current reference virtual noise, i.e. the reference virtual noise to be configured this time. In practical implementation, the updated reference virtual noise may be obtained by a linear combination of the reference virtual noise configured last time and the currently obtained reference virtual noise, as follows:

For the transmitter-end reference virtual noise: RXREFVN(i)$_{newp}$=β*RXREFVN(i)$_{oldp}$+(1−β)*RXREFVN(i)$_{new}$; for the receiver-end reference virtual noise: TXREFVN(i)$_{newp}$=β*TXREFVN(i)$_{oldp}$+(1−β)*TXREFVN(i)$_{new}$.

RXREFVN(i)$_{new}$ and TXREFVN(i)$_{new}$ are the reference virtual noise obtained according to the maximum value of the actual noise, RXREFVN(i)$_{oldp}$ and TXREFVN(i)$_{oldp}$ are previously configured reference virtual noise, RXREFVN(i)$_{newp}$ and TXREFVN(i)$_{newp}$ are the reference virtual noise to be configured this time. β is an adjustment coefficient, with 0 meaning that the new reference virtual noise doesn't involve the previous reference virtual noise.

Inserting the above formula for the currently obtained transmitter-end-reference virtual noise, TXREFVN(i)=Actual_Received_Noise(i)−H log(i)+α into the formula for updating, TXREFVN(i)$_{newp}$=β*TXREFVN(i)$_{oldp}$+(1−β)*TXREFVN(i)$_{new}$, we have the updated transmitter-end reference virtual noise of the ith subcarrier:

$$TXREFVN(i)_{newp} = \beta * TXREFVN(i)_{oldp} + (1-\beta) * TXREFVN(i)_{new}$$
$$= \beta * TXREF\beta * TXREFVN(i)_{oldp} + (1-\beta) *$$
$$(Actual\_Received\_Noise(i) - H\log(i) + \alpha)$$
$$= \beta * TXREF\beta * TXREFVN(i)_{oldp} + (1-\beta) *$$
$$Actual\_Received\_Noise(i) - (1-\beta) *$$
$$(H\log(i) + \alpha)$$

when $b_1 = -(1-\beta)*(H \log(i)+\alpha)$, then from the above formula can obtained:

$$TXREFVN(i)_{newp} = \beta * TXREF\beta * TXREFVN(i)_{oldp} + (1-\beta) * \text{Actual\_Received\_Noise}(i) + b_1$$

H log(i), 0<i≤the number of the subcarriers, is the attenuation feature of each respective subcarrier obtained in the training process. α is an adjustment coefficient, the value of which may be determined empirically, to adjust TXREFVN(i). α may be any value in dB, with a default value being 0 dB. Actual_Received_Noise(i) is a statistic result of the receiver-end-actual noise of the ith subcarrier, for example the receiver-end-actual noise maximum value in dBm/Hz; H log (i) is the attenuation feature of the ith subcarrier obtained during the training process in dB; $b_1$ is an adjustment parameter or an offset parameter in dB, meaning a parameter equivalent to a margin added on the current basis, indicating to add a margin of $b_1$ dB on the basis of the current statistic noise. According to the above formula, the updated reference virtual noise may be obtained by a linear combination of the statistic result on the receiver-end-actual noise and the currently configured reference virtual noise, and the updated reference virtual noise is determined to be reference virtual noise to be configured currently.

Similarly, the updated receiver-end-reference virtual noise of the ith subcarrier is:

$$RXREFVN(i)_{new} = \beta * RXREFVN(i)_{oldp} + (1-\beta) * RXREFVN(i)_{new}$$

$$= \beta * RXREF\beta * TXREFVN(i)_{oldp} + (1-\beta) *$$

$$(\text{Actual\_Received\_Noise}(i) + \alpha)$$

$$= \beta * RXREF\beta * TXREFVN(i)_{oldp} + (1-\beta) *$$

$$\text{Actual\_Received\_Noise}(i) - (1-\beta) * \alpha$$

When $b_2 = -(1-\beta) * \alpha$, from the above formula can obtain:

$$RXREFVN(i)_{new} = \beta * RXREF\beta * TXREFVN(i)_{oldp} + (1-\beta) * \text{Actual\_Received\_Noise}(i) + b_2$$

$b_2$ is an adjustment parameter or an offset parameter in dB, meaning a parameter equivalent to a margin added on the current basis, indicating to add a margin of $b_2$ dB on the basis of the current statistic noise.

According to the above formula, an updated reference virtual noise may be obtained by a linear combination of the statistic result of the receiver-end-actual noise and currently configured reference virtual noise, and the updated reference virtual noise is determined to be reference virtual noise to be configured currently.

The device in the above three embodiments may be consistent with the description of FIG. 2. Furthermore, the reference virtual noise determination module may also include a reference virtual noise updating module, configured to update with the determined reference virtual noise and to determine the updated reference virtual noise as the reference virtual noise of current corresponding subcarrier.

The updating process may include obtaining the updated reference virtual noise by a linear combination of previously configured reference virtual noise and currently obtained reference virtual noise as follows:

For the receiver-end-reference virtual noise, $RXREFVN(i)_{newp} = \beta * RXREFVN(i)_{oldp} + (1-\beta) * RXREFVN(i)_{new}$; for the transmitter-end-reference virtual noise, $TXREFVN(i)_{newp} = \beta * TXREFVN(i)_{oldp} + (1-\beta) * TXREFVN(i)_{new}$.

$RXREFVN(i)_{new}$ and $TXREFVN(i)_{new}$ are reference virtual noises obtained according to the maximum value of the actual noise, $XREFVN(i)_{oldp}$ and $TXREFVN(i)_{oldp}$ are previously configured reference virtual noises, $RXREFVN(i)_{newp}$ and $TXREFVN(i)_{newp}$ are reference virtual noises to be configured this time. β is an adjustment coefficient, with 0 meaning that the new reference virtual noise doesn't involve the previous reference virtual noise.

According to the context, an updated reference virtual noise may be obtained by a linear combination of the statistic result of the receiver-end-actual noise and currently configured reference virtual noise, and the updated reference virtual noise is determined to be the reference virtual noise to be configured currently. A detailed description of the process is omitted here.

The technical schemes of the above three embodiments of the invention may be combined for application, for example combining any two of them or three of them.

The system or device in the above embodiments may be software stored in a non-volatile storage medium, or a hardware carrying software function. The system or device may be loaded in xDSL transceiver at the central office, or xDSL transceiver at the User end, or a host system managing xDSL transceiver at the central office, or a system managing xDSL transceiver at the subscriber end.

The purpose, technical scheme and beneficial effect of the invention have been described in detail with reference to the above embodiments. It should be understood that the above description is only better embodiments of the invention and is not intended to restrict the protection scope of the invention. All modification, equivalent and improvement within the spirit and principle of the invention are intended to be encompassed in the protection scope of the invention.

What is claimed is:

1. A method for determining a reference virtual noise of a Digital Subscriber Line (DSL), comprising:
   obtaining a receiver-end-actual noise of a DSL subcarrier;
   determining a transmitter-end-reference virtual noise according to the obtained receiver-end-actual noise of the DSL subcarrier, an obtained attenuation feature of the DSL subcarrier and an adjustment coefficient;
   configuring a transmitter-end-reference virtual noise parameter of the DSL with the determined transmitter-end-reference virtual noise.

2. The method according to claim 1, wherein obtaining the receiver-end-actual noise of the DSL subcarrier comprises at least one of the following steps:
   collecting parameters of the DSL subcarrier after an adjustment of an on-line reconfiguration, obtaining the receiver-end-actual noise of the DSL subcarrier by calculation according to the collected parameters of the DSL subcarrier provided by the adjustment of the on-line reconfiguration and parameters of the DSL subcarrier obtained during a training process; and
   collecting the parameters of the DSL subcarrier after the training process, obtaining the receiver-end-actual noise of the DSL subcarrier by calculation with the collected parameters of the DSL subcarrier; and obtaining the receiver-end-actual noise of the DSL subcarrier from double end line test (DELT) test results.

3. The method according to claim 1, wherein obtaining the receiver-end-actual noise comprises:
   making statistics of receiver-end-actual noises of the DSL subcarriers obtained in a period of time or a pre-set number of times;
   determining statistic value of the receiver-end-actual noises as the receiver-end-actual noise.

4. The method according to claim 3, wherein statistic result of the receiver-end-actual noise is one of the group consisting of: a receiver-end-actual noise maximum value of the corresponding subcarrier, a receiver-end-actual noise sub-maximum value of the corresponding subcarrier, and a receiver-end-actual noise weighted value after weighting calculation of the receiver-end-actual noise of the corresponding subcarrier.

5. The method according to claim 1, further comprising: obtaining an updated transmitter-end-reference virtual noise by a linear combination of the determined transmitter-end-reference virtual noise and a currently configured reference virtual noise, and determining the updated transmitter-end-reference virtual noise as a transmitter-end-reference virtual noise to be configured currently.

6. The method according to claim 5, wherein the transmitter end is a user end and the receiver end is a central office end; or the transmitter end is a central office end and the receiver end is a user end.

7. A device for determining a reference virtual noise of a Digital Subscriber Line (DSL), comprising an actual noise obtaining module and a reference virtual noise determination module; wherein
the actual noise obtaining module is configured to obtain a receiver-end-actual noise of a DSL subcarrier, and to provide data related with the receiver-end-actual noise of the DSL subcarrier to the reference virtual noise determination module; and
the reference virtual noise determination module is configured to determine a transmitter-end-reference virtual noise according to the data from the actual noise obtaining module, an obtained attenuation feature of the DSL subcarrier and an adjustment coefficient, and to determine a receiver-end-reference virtual noise according to the data from the actual noise obtaining module and an adjustment coefficient.

8. The device according to claim 7, wherein the actual noise obtaining module comprises an adjustment parameter obtaining module, an actual noise calculation module and a storage module; wherein
the adjustment parameter obtaining module is configured to, when enabling on-line reconfiguration (OLR) feature, under a pre-set condition, obtain parameters of subcarrier after a line parameter adjustment by an OLR function triggered by a line change, and to provide the obtained parameter to the actual noise calculation module;
the actual noise calculation module is configured to obtain the receiver-end-actual noise of the DSL subcarrier by calculation according to the parameter of the subcarrier provided by the adjustment parameter obtaining module and a parameter of the DSL subcarrier obtained during a training process, and to provide the calculated actual noise at the receiver to the storage module for storage; and
the storage module is configured to store the receiver-end-actual noise of the subcarrier provided by the actual noise obtaining module.

9. The device according to claim 7, wherein the actual noise obtaining module comprises a training parameter obtaining module, an actual noise calculation module and a storage module; wherein
the training parameter obtaining module is configured to, in a retraining process, under a pre-set condition, obtain a parameter of the DSL subcarrier after training and to provide the obtained parameter to the actual noise calculation module;
the actual noise calculation module is configured to obtain the receiver-end-actual noise of the DSL subcarrier by calculation according to the parameter of each subcarrier provided by the training parameter obtaining module, and to provide the calculated receiver-end-actual noise to the storage module for storage; and
the storage module is configured to store the receiver-end-actual noise of the DSL subcarrier provided by the actual noise obtaining module.

10. The device according to claim 7, wherein the actual noise obtaining module comprises a double end line test (DELT) result obtaining module, an actual noise determination module and a storage module; wherein
the DELT result obtaining module is configured to obtain a DELT test result and to provide the obtained DELT test result to the actual noise determination module;
the actual noise determination module is configured to obtain the receiver-end-actual noise of the DSL subcarrier from the DELT test result provided by the DELT result obtaining module, and to provide the obtained receiver-end-actual noise to the storage module for storage; and
the storage module is configured to store the receiver-end-actual noise of each subcarrier provided by the actual noise determination module.

11. The device according to claim 7, wherein, the data related with the receiver-end-actual noise of the subcarrier is the receiver-end-actual noise of the subcarrier obtained in a period of time or a pre-configured number of times, and the reference virtual noise determination module is configured to make statistics of the receiver-end-actual noise of the subcarrier obtained in a period of time or a pre-set number of times, and to determine the reference virtual noise according to a statistic result of the receiver-end-actual noise; or
the data related to the receiver-end-actual noise of the subcarrier is the statistic result of the receiver-end-actual noise of the subcarrier obtained by the actual noise obtaining module in a period of time or a pre-set number of times, and the reference virtual noise determination module is configured to determine the reference virtual noise according to the statistic result of the receiver-end-actual noise, the statistic result of the receiver-end-actual noise is a receiver-end-actual noise maximum value of the corresponding subcarrier, or a receiver-end-actual noise sub-maximum value of the corresponding subcarrier, or a receiver-end-actual noise weighted value after weighting calculation of the receiver-end-actual noise of the corresponding subcarrier.

12. The device according to claim 11, wherein the reference virtual noise determination module comprises:
a first reference virtual noise determination module, configured to determine a transmitter-end-reference virtual noise of the corresponding subcarrier, according to the statistic result of the receiver-end-actual noise and an attenuation feature of the DSL subcarrier obtained in a training process; and
a second reference virtual noise determination module, configured to determine a receiver-end-reference virtual noise of the corresponding subcarrier according to the statistic result of the receiver-end-actual noise.

13. The device according to claim 7, wherein the reference virtual noise determination module further comprises:
a virtual noise updating module, configured to obtain an updated reference virtual noise by a linear combination of the determined reference virtual noise and a currently configured reference virtual noise, and to determine the updated reference virtual noise as a reference virtual noise to be configured currently.

14. A configuration system for a Digital Subscriber Line (DSL), comprising:

a reference virtual noise determination device, configured to obtain a receiver-end-actual noise of a DSL subcarrier, and to determine a reference virtual noise according to the receiver-end-actual noise of the DSL subcarrier; and a line template module, configured to configure a transmitter-end-reference virtual noise parameter of the DSL according to the reference virtual noise provided by the reference virtual noise determination device, an obtained attenuation feature of the DSL subcarrier and an adjustment coefficient, and to determine a receiver-end-reference virtual noise according to the data from the actual noise obtaining module and an adjustment coefficient.

15. The configuration system according to claim 14, wherein the reference virtual noise determination device is further configured to linearly combine the determined reference virtual noise and a currently configured reference virtual noise to obtain an updated reference virtual noise, and to determine the updated reference virtual noise as a reference virtual noise to be configured currently.

16. The configuration system according to claim 14, wherein the reference virtual noise determination device is further configured to linearly combine the receiver-end-actual noise of the DSL subcarrier and a currently configured reference virtual noise to obtain an updated reference virtual noise, and to determine the updated reference virtual noise as a reference virtual noise to be configured currently.

17. The configuration system according to claim 14, wherein the configuration system is arranged in at least one of the following devices:

an xDSL transceiver at a central office, an xDSL transceiver at a user end, a host system managing an xDSL transceiver at the central office, and a system for managing an xDSL transceiver at the user end.

18. A computer readable storage medium recording a computer readable program enabling a computing unit to execute the following methods:

obtaining a receiver-end-actual noise of a Digital Subscriber Line (DSL) subcarrier; and determining a transmitter-end-reference virtual noise according to the obtained receiver-end-actual noise of the DSL subcarrier, an obtained attenuation feature of the DSL subcarrier and an adjustment coefficient;

determining a receiver-end-reference virtual noise according to the obtained receiver-end-actual noises of the DSL subcarrier and an adjustment coefficient;

configuring a reference virtual noise parameter of the DSL with the determined transmitter-end-reference virtual noise and the receiver-end-reference virtual noise.

19. The method according to claim 1, wherein determining the transmitter-end-reference virtual noise according to a formula:

TXREFVN (i)=Actual_Received_Noise(i)−H log(i)+α, wherein, TXREFVN(i) indicates a transmitter-end-reference virtual noise of the $i^{th}$ subcarrier, Actual_Received_Noise(i) indicates the obtained receiver-end-actual noise of the $i^{th}$ subcarrier, H log(i) indicates an attenuation feature of the $i^{th}$ subcarrier, α indicates an adjustment coefficient.

20. The method according to claim 19, wherein determining a transmitter-end-reference virtual noise further comprising:

determining a transmitter-end-reference virtual noise to be configured according to a formula:

TXREFVN(i)$_{newp}$=β*TXREFVN(i)$_{oldp}$+(1−β)*TXREFVN(i), wherein, TXREFVN(i) indicates the transmitter-end-reference virtual noise of the $i^{th}$ subcarrier, TXREFVN(i)$_{oldp}$ indicates a transmitter-end-reference virtual noise of the $i^{th}$ subcarrier configured last time, TXREFVN(i)$_{newp}$ indicates a transmitter-end-reference virtual noise of the $i^{th}$ subcarrier to be configured currently, β indicates an adjustment coefficient;

determining the transmitter-end-reference virtual noise to be configured as the transmitter-end-reference virtual noise.

21. A method for determining reference virtual noise of a Digital Subscriber Line (DSL), comprising:

obtaining a receiver-end-actual noise of a DSL subcarrier;

determining a receiver-end-reference virtual noise according to the obtained receiver-end-actual noises of the DSL subcarrier and an adjustment coefficient;

configuring a receiver-end-reference virtual noise parameter of the DSL with the determined receiver-end-reference virtual noise.

22. The method according to claim 21, wherein determining the receiver-end-reference virtual noise according to a formula: RXREFVN(i)=Actual_Received_Noise(i)+α, wherein, RXREFVN(i) indicates a receiver-end-reference virtual noise of the $i^{th}$ subcarrier, Actual_Received_Noise(i) indicates the obtained receiver-end-actual noise of the $i^{th}$ subcarrier, α indicates an adjustment coefficient.

23. The method according to claim 22, wherein determining a receiver-end-reference virtual noise further comprising:

determining a receiver-end-reference virtual noise to be configured according to a formula:

RXREFVN(i)$_{newp}$=β*RXREFVN(i)$_{oldp}$+(1−β)*RXREFVN(i), wherein, RXREFVN(i) indicates the receiver-end-reference virtual noise of the $i^{th}$ subcarrier, RXREFVN(i)$_{oldp}$ indicates a receiver-end-reference virtual noise of the $i^{th}$ subcarrier configured last time, RXREFVN(i)$_{newp}$ indicates a receiver-end-reference virtual noise of the $i^{th}$ subcarrier to be configured currently, β indicates an adjustment coefficient;

determining the receiver-end-reference virtual noise to be configured as the receiver-end-reference virtual noise.

\* \* \* \* \*